Dec. 31, 1968

F. L. MOBBS 3,419,108

PORTABLE TREE STAND

Filed Oct. 19, 1966

Freddie L. Mobbs
INVENTOR.

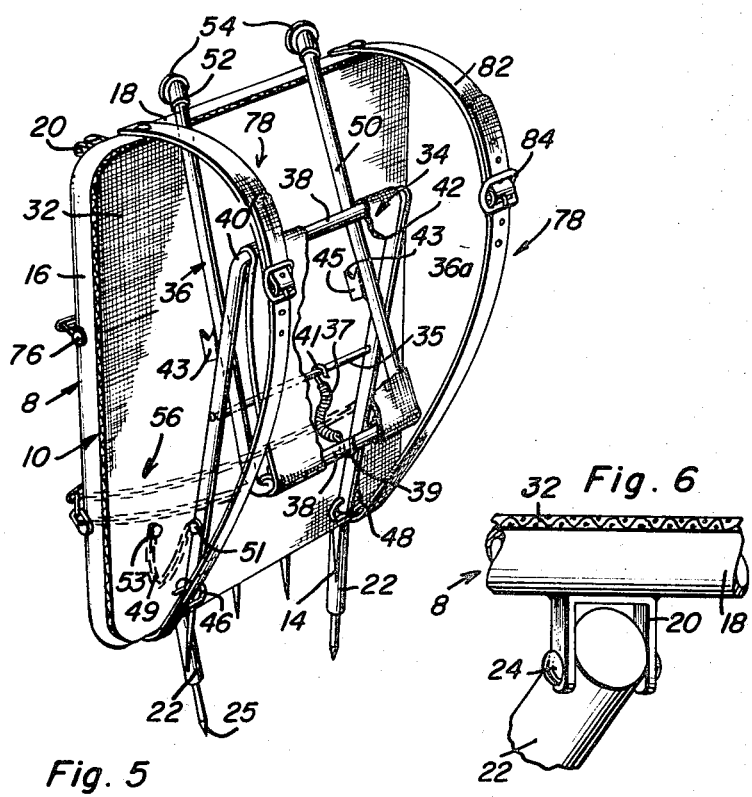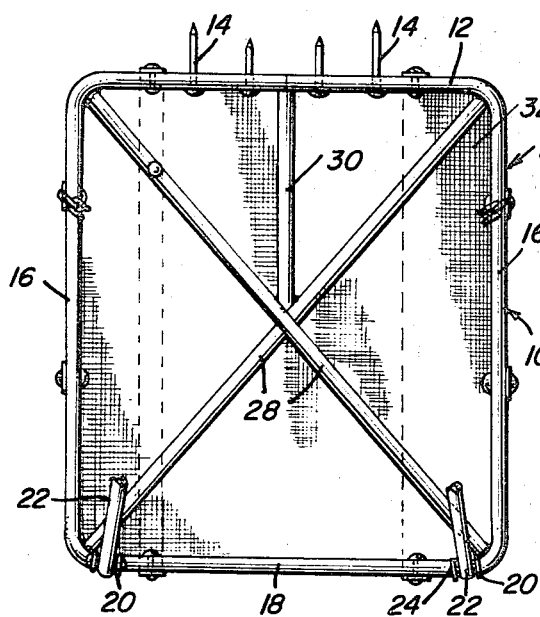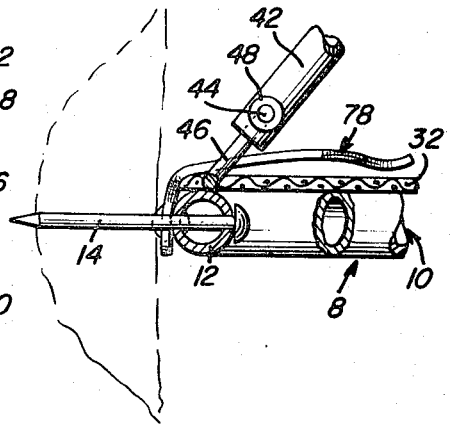

United States Patent Office 3,419,108
Patented Dec. 31, 1968

3,419,108
PORTABLE TREE STAND
Freddie L. Mobbs, P.O. Box 141,
Greenbrier, Ark. 72058
Filed Oct. 19, 1966, Ser. No. 587,790
6 Claims. (Cl. 182—129)

ABSTRACT OF THE DISCLOSURE

A portable stand for use by a hunter when waiting on game and using, as the case may be, a bow and arrow or a gun. It comprises a screen-covered frame having spikes capable of being embedded in the trunk of a tree. This frame has a load-binder-type sling which is looped and bound around the tree's trunk. It is also provided with depending stabilizing props or legs. A folding camper's-type leg-supported stool is cooperatively joined to and, when erected for use, resides atop the platform. Complemental self-contained strap means is provided in a manner that the complete stand can be harnessed and carried on the hunter's back. This stand is safe and comfortable and affords effective visibility.

---

This invention relates to a new and improved portable and foldable tree stand for hunters characterized by novel platform means which is readily attachable to and detachable from the trunk of a tree, an easy-to-erect but collapsible camp-type stool oriented and operatively coacting with said platform means, and complemental built-in strap means, whereby the over-all stand after being compactly folded, can be harnessed and carried on the hunter's back from place-to-place.

The stand hereinafter disclosed is designed and adapted to promote safety and comfort, to enable the hunter to survey the field of operation, and to use (1) a bow and arrow or (2) a gun when hunting for deer, ducks and wild game. Experimental usage has shown that the duck hunter can set up the novel stand at the base of the tree's trunk, say at a level of six inches more or less, above the nearby water's level for advantageous visibility and good results. On the other hand, deer hunters can and do attach the stand to the tree trunk at a safe level up in the area of the branches when such a place of vantage is deemed to be best for effective shooting needs.

The invention offers users a feasible platform and seat combination which is strong and durable and will safely hold and support up to and beyond 600 pounds. The load-binder-type sling or chain means herein employed is such that it can be reliably used on trees ranging from 6 inches to 30 inches in diameter. The over-all structure can be and preferably is camouflaged to promote hidden and highly efficient above-ground usage. Instead of risking a fall from a tree limb, the present invention insures the desired stand and stance for deer hunting with a bow. When standing or sitting and using a gun the hunter can aim and shoot downwardly at an angle and avoid shooting from ground level and accidentally shooting a nearby hunter, as often happens.

An object of the invention is to improved structurally and functionally upon prior art folding and transportable seat-equipped stands such as for example that which is disclosed in the R. E. Hundley, Jr. Patent 3,065,821. To the ends desired, the platform herein used is characterized by a tubulr metal or equivalent rectangular frame having a taut covering of requisite character and design forming a stable base for the folding pivotally attached stool or seat. By using flexible duct material for a seat insures the degree of comfort necessary and permits the trunk of the tree to serve as a backrest. Then, too, the construction shown and described enables the hunter to tirelessly pursue the act of waiting on game and insures the over-all comfort and convenience desired.

The construction and arrangement is such that is enables the hunter to inspect and survey the area or field of operation and to spot the prey at a remote but within-range distance. Then, too, the stool or seat is amply large for comfort and yet suitably small to provide marginal ledges on which the hunter may stand with safety when not using the seat.

Further novelty is predicated on the canvas-seat stool embodying a pair of U-shaped leg-frames whose legs are crossed and releasably latched together and wherein the rearward ends of the legs of one leg frame are hingedly joined to the rearward end member of the frame of the platform and wherein the lower ends of the outward or forward legs of the other leg frame have suitably angled feet which when in use reside flatwise on the web or screen or equivalent covering on the platform.

Further novelty is predicated on the use of pointed prongs on the inner or rearward marginal edge of the platform frame which are embedded in the trunk of the tree and wherein additional pointed prongs are provided on corresponding rearward or inner ends of diagonally depending braces or props which props greatly assist in shoring up and positioning the platform, whereby to permit the same to be hitched in place on the tree trunk in a desired safe and practical manner.

In addition to the above it is to be pointed out that adjustable buckle-equipped straps are provided and have end portions attached to the platform and properly arranged and paired to provide a carrying harness, that is, one which permits the wholly collapsed device (FIG. 3) to be compactly carried on one's back and to assume an out-of-the-way position which enables the hunter to carry out his hunting expedition while roving around or travelling to and from the hunting ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a view in perspective with the stool and props collapsed and showing how they orient themselves with the platform when the strap means is brought into play as a harness and the over-all device is readied for carrying on the user's back.

FIG. 4 is an enlarged detail view with parts in section and elevation detailing certain of the features.

FIG. 5 is a bottom plan view of the base or platform with parts omitted for clearness of illustration.

FIG. 6 is a fragmentary detail view primarily in elevation taken on the vertical line 6—6 of FIG. 2.

Figure 1:
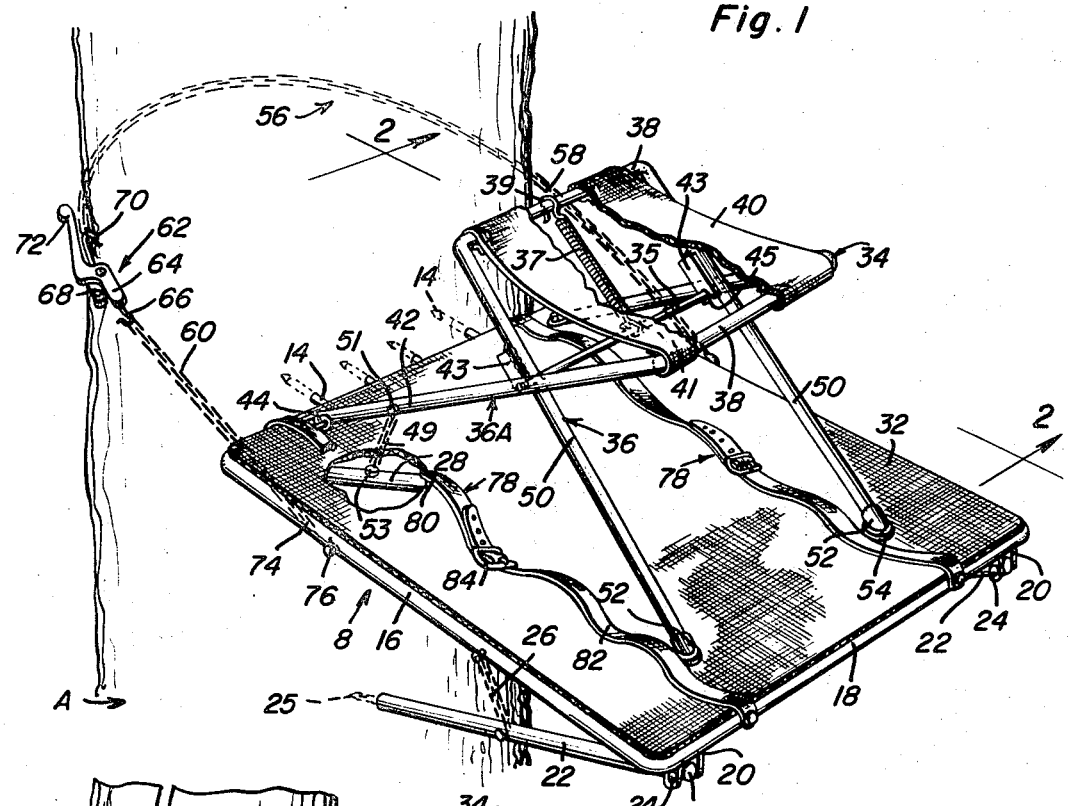
FIG. 1 is a view in perspective, with portions broken away, showing a fragmentary portion of a tree and illustrating the over-all ready-to-use stand erected and hitched on the tree and the folding stool or seat elevated for use.
Figure 2:
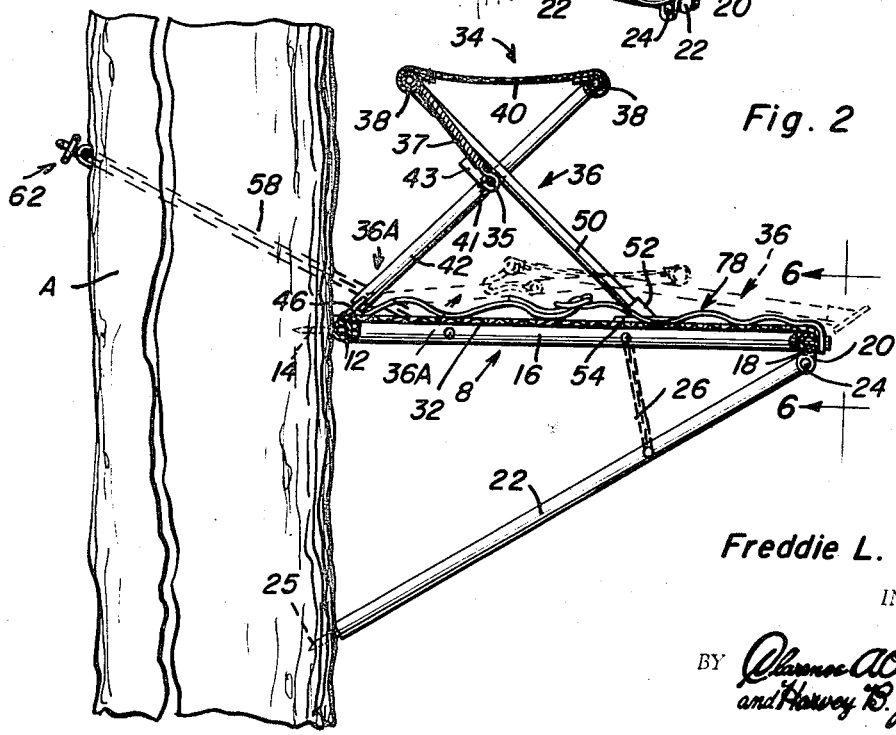
FIG. 2 is a section on a reduced scale taken on the plane of the section line 2—2 of FIG. 1.

Taking up first that part of the over-all device or stand which constitutes the main base unit, it is referred to, generally speaking, as a platform 8. With specific reference now to FIG. 5 it will be seen that this platform comprises a substantially rectangular tubular metal frame 10 characterized by a rearward or inward frame member 12 provided with suitably attached and projecting properly proportioned and spaced pointed prongs 14 which in practice are adapted to be forced and embedded in the trunk A of the tree in the manner shown in FIGS. 1 and 2. The side frame members are denoted at 16 and the forward or outer frame member is denoted at 18. Referring now to FIG. 6 it will be seen that the frame member 18 is provided inwardly of left and right corner portions with duplicate depending U-shaped brackets 20 to accommodate, in each instance, the end portion 22 of one of the pair of positioning and stabilizing legs or props. This end portion 22 is fitted and pivotally mounted between the arms of the U-bracket 20 as denoted at 24. Continuing with the legs 22 it will be seen in FIG. 2 that the inner or lower end portion of each leg is provided with a fixed axial prong 25 which is also adapted to be embedded in the tree. The numeral 26 in each instance designates a stay or chain which facilitates angling the leg 22 into the position shown. With reference again to the frame 10 it is suitably reinforced by an X-shaped brace made up of crossed diagonal braces 28 in (FIG. 5) with an additional or suitably shortened brace 30. These several braces 28 and 30 provide an extremely strong frame structure for the cover means. This cover means comprises a suitably fabricated screen (or heavy duty burlap) 32 which is marginally affixed to the frame members 12, 16 and 18 and provides a flat and firm surface for the user to stand on as well as a supporting surface for the collapsible or foldable seat means, more particularly, the camp-style stool 34. The stool comprises a pair of independent but companion U-shaped companion leg frames 36 and 36A, respectively, which are basically the same in construction and which have their respective bight portions 38 connected by suitable hems to a canvas or other equivalent flexible seat 40. Each rearwardly directed leg 42 (see FIG. 4) has its lower end portion hingedly connected with the upper horizontal limb 44 of a U-shaped anchoring clip 46 which is suitably fixed in place atop the frame member 12 in the manner shown. An assembling and retaining washer 48 assists in keeping the leg-end 42 hingedly in place. It follows that the outer leg frame 36A is hingedly attached to the platform 8. Referring now to the forwardly and downwardly directed legs 50 of the inner leg frame 36 (FIGS. 1 and 2) it will be seen that the lower end portions of said legs are fitted and fixed in socket members 52 which are provided with fixed ovate flat-bottom feet 54 which rest atop the screen 32 when the stool or seat 34 is set up for use (FIGS. 1 and 2). It should be noted in particular that the stool or seat is such in construction that it provides a satisfactory rest for the user and enables him to employ the trunk of the tree as a backrest. In addition the leg frames 36 and 36A are narrow and are so positioned relative to the larger area of the screen surface 32 that the left and right marginal ledge-like portions of the latter provide ample standing room. Accordingly, the hunter can either (1) stand up for aiming and shooting or (2) can sit down, particularly when resting and surveying and sizing-up the field or area which is being hunted.

In addition to the prongs, spurs or other means on the frame 10 and legs 22 a chain-type hitching sling is employed, the same denoted generally by the numeral 56 (FIG. 1) and comprising chains 58 and 60 which have their adjacent ends linked together by a dual link fastener 62. One link is denoted at 64 and the other link is denoted at 68 and it has a hook 70 connectible adjustably with links of the chain-end. The links are pivoted together and a trip lever or handle 72 is provided for convenient use. The forward end portions 74 of the chains 58 and 60 are connected as at 76 with median portions of the side members 16 of the over-all frame 10.

It will be further noted that the top side of the covered frame is provided with strap means 78, namely, two straps 80 and 82 connected together by buckle means 84. The strap ends are suitably attached to the forward and rearward frame members and hence the straps can be used as a carrying harness when the legs of the seat means are folded into the compact and convenient arrangement shown in FIG. 3. The tree looping and retaining chain means 56 can be wrapped and hitched around the structure as suggested in FIG. 3 to assist in comfortably carrying and handling the device in the manner and for the purposes which are thought to be clear and self-evident.

A closer study and analysis of the stool or seat 34 will reveal that, while it is characterized by two inverted U-shaped leg frames 36 and 36A whose front and rear bight portions 38 are joined to a hem-equipped canvas seat 40, it is nevertheless of unque construction. To the improved end result desired, it will be noted that a horizontal rod 35 is provided and bridges the space between and is joined at its ends to the two rearwardly inclined legs 42 of the aforementioned outer leg frame 36A and, as shown in FIG. 1, a suitably tensioned coil spring 37 has its left hand end 39 suitably hooked and anchored on a median portion of the rearward bight portion 38 of the "inner" frame 36. The right hand end portion of the spring is provided with a hook 41 which is releasably but retentively hooked on the rod 35. The "inside" legs 50 are provided on median edge portions with welded rectangular cleats 43 whose lower ends are provided with V-shaped keeper seats or notches 45 which are so located and oriented that they are releasably engageable with adjacent coacting end portions of the rod 35. Accordingly, the respective end portions of the rod 35 provide keepers over which the V-shaped keeper seats 45 are spring-biased and retentively but releasably engaged. It follows that the crossed legs 42 and 50 are not positively pivoted together but are bodily latched by the spring-biased cleats or brackets 43 and terminal end portions of the rod 35. Therefore, the seat or stool 34 can be manually erected and set up for use atop the screen surface 32 as illustrated and held by the action of the spring 37. Also, and because the legs 42 and 50 are separably latched (not positively hinged as is usual with X-type leg frames) the leg frames can be readily disconnected and compactly folded, as shown in dotted lines in FIG. 2 and full lines in FIG. 3. A careful comparison of FIG. 1 with FIG. 3 should clarify these featured aspects of the over-all concept. Accordingly, the stool can be readily set up (with the leg frames safely latched in place) or, alternatively, folded to assume the collapsed state shown in FIG. 3.

Then, too, suitably provided stays (simple chains 49) aid greatly in holding the back legs 42 in such a position that when the seat or stool is erected the back or left component 38 (FIG. 2) does not ram against the tree trunk, that is, when catching hold of and pushing the front legs 59 (FIGS. 1 and 2) upwardly and in a manner to bring the spring-biased but releasable latching brackets 43 into play. The upper end 51 of each chain is riveted to a coacting leg 42 (FIG. 1) and the lower end is riveted as at 53, to the brace 28.

It will be noted that the four coplanar spikes 14 are contoured to fit any size tree and that the load binder chain means serves to encircle or embrace the tree and to assist in securely hitching the stand in a usable position thereon. There are no cables to interfere with footing and the platform is supported on the tree in such a manner that the user can stand in any position, front or either side and shoot in confidence that his stand is not going to move or tilt in any way particularly because of the fact that the downwardly inclined legs or braces 22 insure a stable attachment of the over-all device to the tree.

It is reiterated that the aforementioned horizontal rod 35 is carried entirely by the outer U-frame 36A; that is, the rod spans the space between the opposed parallel legs 42 and has its ends fixed to the respectively coacting legs. To the ends desired, the legs 50 on the inner and accordingly smaller U-frame 36 movably contact the coacting surfaces of the respective legs 42. The notched cleats 43 must be so located and fixed on median portions of the legs 50 that the keeper notches engage atop and over the respective end portions of the rod 35 to accomplish the latching result which is attained when the stool is set up for use as illustrated in FIGS. 1 and 2. The coil spring 37 is at this time stretched tautly between the rod 35 and bight portion 38 of the U-frame 36 and the resulting spring tension keeps the cleats 43 in stool-erecting and latching engagement with rod 35. However, and at the same time this construction and arrangement permits disengagement of the cleats 43 from rod 35 and consequent compact folding (for carrying) as clearly shown in FIG. 3.

The views singly and collectively show the construction of the component parts and the manner in which they are constructed and cooperate in expanded or usable position as shown for instance in FIGS. 1 and 2 and then folded or collapsed for transportation and storage as shown in FIG. 3. For these and other reasons it is believed that the invention, the features and advantages and manner of use will be clear to the reader. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown an described, and accordingly all suitable modifications and equivalents may be resorted to, falling within the scope of the invention as claimed.

What is claimed as new is as follows:

1. For adjustable attachment to and temporary use on the trunk of a tree, a portable stand for a hunter when (1) waiting on game or (2) when using a bow and arrow or a gun comprising; a platform adapted to occupy and maintain a usable position horizontal to the verticality of said tree, load-binder-type means embodying companion chains having forward ends secured to and adapted to support said platform from opposite sides thereof and rearward end portions separably adjustably joined by a quick-connectible chain-end fastener, said chains adapted to be looped clampingly bound around said tree in a manner to position a rearward marginal edge portion of said platform against an oriented surface of said tree, said rearward marginal edge being provided with coplanar distributively spaced spikes adapted to penetrate and removably anchor themselves in the surface of said tree, whereby said spikes in conjunction with said load binder coordinate in reliably and operatively mounting said platform at a place of vantage on said tree, folding prop means for said platform comprising a pair of legs having forward ends hingedly joined to respectively cooperable forward corner portions of said platform, said legs underlying the respectively coacting marginal side portions of said platform and including rearwardly and downwardly and having rearward free ends terminating in pointed prongs designed and adapted to be forcibly driven and anchored in said tree to assist in locating and retaining said platform in a given ready-to-use position, a folding camper's-type leg-supported stool carried by and adapted to reside atop said platform, said stool embodying a pair of inner and outer companion U-shaped leg frames whose bight portions are rotatably connected with coacting hems provided therefor on a canvas seat and whose respective legs are overlapped and crossed when in use, the lower ends of the rearwardly inclined legs of the outer leg frame being hingedly bracketed and joined to a coacting rearward marginal portion of said platform, the lower ends of the forwardly, downwardly inclined legs of the inner leg frame having fixed oblique angled feet adapted to rest flatwise atop said platform.

2. The stand according to claim 1, and wherein said platform comprises a rectangular frame embodying frame members joined and rigidly braced by interconnected stabilizing braces, said frame having its top side spanned and fully covered with occupant supporting material of a sturdy non-corrodible grade for outdoor use.

3. The stand defined in and according to claim 1, and wherein a rigid rod spans the space between and has its respective outer ends fixedly joined to median portions of the respective rearwardly inclined legs of said outer U-frame, cleats fixed on median portions of the forwardly downwardly inclined legs of the inner frame, said cleats having V-shaped keeper notches releasably engaging coacting end portions of said rod, said cleats providing quickly engageable and releasable U-frame connecting and disconnecting brackets, and a coil spring normally under tension when the stool is erected and in use, said spring having one end joined to the bight portion of said inner U-frame and its other end joined to a median portion of said rod.

4. The stand according to claim 3, and wherein said stool is collapsible and foldable compactly atop said platform for transporting and storage and, in combination, a pair of spaced parallel shoulder straps overlying the top side of the platform and extending from front to rear and designated and adapted to permit the hunter to strap the over-all attachment on his back while actually hunting, or, alternatively, transporting his gear to and from the hunting ground.

5. A portable stand comprising, a platform embodying a rigid covered frame having an inwardly disposed frame member provided with spaced projecting spikes and adapted to be embedded in the trunk of a tree at a selected height above ground level, a load-binder-type platform suspending sling carried by said frame and adapted to be looped and bound around said tree trunk in a manner to assist in locating and retaining said platform in a plane horizontal to the vertical axis of said trunk, prop means for said platform comprising a pair of legs having forward ends hingedly joined to respectively cooperable forward corner portions of said platform, said legs underlying the respectively coacting marginal side portions of said platform and inclining rearwardly and downwardly and having rearward free ends terminating in pointed prongs adapted to be forcibly driven and anchored in said trunk to assist in locating and retaining said platform in a given position, a folding camper's type leg-supported stool operatively joined to, carried by, and adapted to reside when set up for use atop said platform, said stool embodying a pair of U-shaped leg frames whose bight portions are connected by a seat and whose respective legs are criss-crossed with their median portions separably connectible, the lower ends of the rearwardly inclined legs being hingedly bracketed to a coacting rearward marginal portion of said platform, the lower ends of the forwardly downwardly inclined legs having fixed oblique angled feet adapted to rest flatwise atop said platform, said stool being foldable compactly atop said platform for transporting and storage and a pair of spaced parallel shoulder straps overlying the top side of the platform and extending from front to rear and designed and adapted to permit the hunter to strap the over-all attachment on his back while actually hunting, or alternatively, transporting his gear to and from the hunting ground.

6. A portable stand comprising, a platform embodying a rigid covered frame having an inwardly disposed frame member provided with spaced projecting spikes and adapted to be embedded in the trunk of a tree at a selected height above ground level, a load-binder-type platform suspending sling carried by said frame and adapted to be looped and bound around said tree trunk in a manner to assist in locating and retaining said platform in a plane horizontal to the vertical axis of said trunk, prop means for said platform comprising a pair of legs having forward ends hingedly joined to respectively cooperable forward corner portions of said platform, said legs underlying the respectively coacting marginal side portions of said platform and inclining rearwardly and downwardly and having rearward free ends terminating in pointed prongs adapted to be forcibly driven and anchored in said trunk to assist in locating and retaining said platform in a given position, a folding camper's-type leg-supported stool operatively joined to and residing atop said platform when said stool is set up for use, said stool embodying a pair of U-shaped leg frames having bight portions connected by a flexible seat, the respective legs of said leg frames being criss-crossed and having median portions separably connectible with each other, the rearwardly inclined legs having lower ends hingedly bracketed to a rearward marginal portion of said platform, said forwardly and downwardly inclined legs having lower ends adapted to rest firmly atop said platform, and said stool being foldable compactly atop said platform when the user desires to transport or store said stand.

References Cited

UNITED STATES PATENTS

| | | | |
|---|---|---|---|
| 1,542,548 | 6/1925 | Gordon | 182—187 |
| 2,532,873 | 12/1950 | Abramson | 297—56 |
| 3,067,975 | 12/1962 | Wilcox | 182—187 |
| 3,338,332 | 8/1967 | Brantly | 182—187 |
| 3,116,808 | 1/1964 | Riley | 182—187 |

REINALDO P. MACHADO, *Primary Examiner.*

U.S. Cl. X.R.

182—152, 187